(12) United States Patent
Nohmi et al.

(10) Patent No.: US 12,070,638 B2
(45) Date of Patent: Aug. 27, 2024

(54) FIRE FIGHTING SYSTEM USING DRONE

(71) Applicant: Ebara Corporation, Tokyo (JP)

(72) Inventors: Motohiko Nohmi, Tokyo (JP); Yumiko Sekino, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 976 days.

(21) Appl. No.: 17/048,893

(22) PCT Filed: Apr. 19, 2019

(86) PCT No.: PCT/JP2019/016841
§ 371 (c)(1),
(2) Date: Jan. 20, 2021

(87) PCT Pub. No.: WO2019/208440
PCT Pub. Date: Oct. 31, 2019

(65) Prior Publication Data
US 2021/0138281 A1    May 13, 2021

(30) Foreign Application Priority Data

Apr. 25, 2018  (JP) .................................. 2018-083905
Nov. 13, 2018  (JP) .................................. 2018-213059

(51) Int. Cl.
*A62C 3/02*    (2006.01)
*A62C 31/28*   (2006.01)
(Continued)

(52) U.S. Cl.
CPC ............ *A62C 3/0242* (2013.01); *A62C 31/28* (2013.01); *B64C 39/024* (2013.01); *B64D 1/18* (2013.01);
(Continued)

(58) Field of Classification Search
CPC ............................ A62C 3/0228; A62C 3/0242
(Continued)

(56) References Cited

U.S. PATENT DOCUMENTS 3,762,478 A * 10/1973 Cummins .............. A62C 27/00
169/25
4,934,629 A    6/1990 Brant
(Continued)

FOREIGN PATENT DOCUMENTS

CN    107308569 A    11/2017
JP    S64-086984 A    3/1989
(Continued)

OTHER PUBLICATIONS

Japan Patent Office, International Search Report and the Written Opinion in International Application No. PCT/JP2019/016841 (Jul. 16, 2019).

*Primary Examiner* — Christopher S Kim
(74) *Attorney, Agent, or Firm* — Leydig, Voit & Mayer, Ltd.

(57) ABSTRACT

The present invention relates to a fire fighting system for transporting a nozzle of a fire hose coupled to a drone to a high place. The fire fighting system includes a fire hose (10) having a fire hose (10) having a nozzle (11) for injecting a fire extinguishing liquid; a fire-extinguishing-liquid supply source (2) which is coupled to the fire hose (10), and supplies the fire extinguishing liquid to the fire hose (10); a top drone (1) coupled to the nozzle (11); a wired cable (4) coupled to the top drone (1); and a power supply unit (3) which supplies power or fuel for flying the top drone (1) through the wired cable (4).

2 Claims, 15 Drawing Sheets

(51) Int. Cl.
*B64C 39/02* (2023.01)
*B64D 1/18* (2006.01)
*B64D 27/02* (2006.01)
*B64D 27/16* (2006.01)
*B64D 27/24* (2024.01)
*B64D 37/00* (2006.01)
*B64F 3/02* (2006.01)
*A62C 27/00* (2006.01)
*B64D 27/353* (2024.01)
*B64U 10/13* (2023.01)
*B64U 30/20* (2023.01)
*B64U 50/11* (2023.01)
*B64U 50/12* (2023.01)
*B64U 50/15* (2023.01)
*B64U 50/19* (2023.01)
*B64U 50/34* (2023.01)
*B64U 101/00* (2023.01)

(52) U.S. Cl.
CPC .......... *B64D 27/023* (2013.01); *B64D 27/16* (2013.01); *B64D 27/24* (2013.01); *B64D 37/005* (2013.01); *B64F 3/02* (2013.01); *A62C 27/00* (2013.01); *B64D 27/353* (2024.01); *B64U 10/13* (2023.01); *B64U 30/20* (2023.01); *B64U 50/11* (2023.01); *B64U 50/12* (2023.01); *B64U 50/15* (2023.01); *B64U 50/19* (2023.01); *B64U 50/34* (2023.01); *B64U 2101/00* (2023.01)

(58) Field of Classification Search
USPC .............................. 169/24, 52, 53; 239/171
See application file for complete search history.

(56) References Cited

U.S. PATENT DOCUMENTS

| | | |
|---|---|---|
| 9,387,928 B1 | 6/2016 | Gentry et al. |
| 2012/0056041 A1 | 3/2012 | Rhee et al. |
| 2017/0043872 A1 | 2/2017 | Whitaker |
| 2017/0113787 A1 | 4/2017 | Hein |
| 2017/0225784 A1 | 8/2017 | Hayes et al. |
| 2019/0160315 A1* | 5/2019 | Head .................... G05D 1/0094 |
| 2022/0023685 A1* | 1/2022 | Nohmi .................. B64U 10/13 |

FOREIGN PATENT DOCUMENTS

| | | |
|---|---|---|
| JP | 2012-051545 A | 3/2012 |
| JP | 2017-149402 A | 8/2017 |
| WO | WO 2014/080385 A2 | 5/2014 |
| WO | WO 2018/046973 A2 | 3/2018 |

* cited by examiner

FIRE FIGHTING SYSTEM USING DRONE

CROSS-REFERENCE TO RELATED APPLICATIONS

This patent application is the U.S. national phase of International Application No. PCT/JP2019/016841, filed Apr. 19, 2019, which claims the benefit of Japanese Patent Application No. 2018-213059, filed on Nov. 13, 2018, and Japanese Patent Application No. 2018-083905, filed on Apr. 25, 2018, which are incorporated by reference in their entireties herein.

TECHNICAL FIELD

The present invention relates to a fire fighting system using drone, and more particularly relates to a fire fighting system for transporting a nozzle of a fire hose coupled to drone to a high place.

BACKGROUND ART

In recent years, the number of high-rise buildings, such as skyscrapers, has been increasing. If a fire occurs in such a high-rise building, it may cause great human damage and great economic damage. In particular, when a fire occurs in a high-rise floor above height at which ladder trucks can discharge water, there is a high risk of serious human damage and economic damage due to the inability to carry out quick fire fighting activities.

A drone defined as an unmanned mobile which can move in the air or in the water or in both areas is widely used in various fields such as photographing or monitoring, checking or inspecting, or measuring. The drone moves autonomously according to a preset object, or is maneuvered using a wireless means (one of radio wave, visible light, laser beams of every wavelength range, sonic wave, and ultrasonic wave, or any combination thereof) by a human operator, or is controlled wirelessly by an external controller (including a computer).

Accordingly, when a fire occurs in a high place, such as a high-rise floor, a drone, to which a nozzle of a fire hose is connected is desired to fly to the vicinity of the place where the fire has occurred. If the drone, which is an unmanned mobile, can transport the nozzle of the fire hose to the vicinity of the high-rise floor where the fire is breaking out, the fire fighting activities can be carried out safely and quickly.

CITATION LIST

Patent Literature

Patent document 1: U.S. Pat. No. 9,387,928
Patent document 2: Japanese laid-open patent publication No. 2012-51545

SUMMARY OF INVENTION

Technical Problem

However, the drone is typically equipped with a power source (all kinds of power sources such as a battery, a storage battery, a condenser, and a fuel cell, or a fuel for combustion), and is flown by the power supplied from the power source. The power source which can be mounted on the drone has a limitation in a capacity, so that a flight time of the drone is inevitably limited. Accordingly, the drone cannot have a flight time required to completely extinguish a fire occurring in high-rise buildings.

It is therefore an object of the present invention to provide a fire fighting system capable of carrying out sufficient fire fighting activities without causing restrictions on a flight time of a drone.

Solution to Problem

In one aspect of the present invention, there is provided a fire fighting system, comprising: a fire hose having a nozzle for injecting a fire extinguishing liquid; a fire-extinguishing-liquid supply source which is coupled to the fire hose, and supplies the fire extinguishing liquid to the fire hose; a top drone coupled to the nozzle; a wired cable coupled to the top drone; and a power supply unit which supplies power or fuel for flying the top drone through the wired cable.

In a preferred aspect of the present invention, the power supply unit includes a power source for supplying electric power to the top drone, and the top drone has a rotary blade or a rotor to be rotated by the electric power.

In a preferred aspect of the present invention, the power supply unit includes a pump unit for supplying fuel to the top drone, and the top drone has an internal-combustion engine configured to combust the fuel to rotate a rotary blade or a rotor.

In a preferred aspect of the present invention, the power supply unit includes a pump unit for supplying a jet fuel to the top drone, and the top drone has a jet engine configured to combust the jet fuel to generate a thrust.

In a preferred aspect of the present invention, the power supply unit includes a pump unit for supplying a gas fuel and a gas oxidizer to the top drone, and the top drone has a gas rocket engine configured to combust a mixture fuel of the gas fuel and the gas oxidizer to generate a thrust.

In a preferred aspect of the present invention, the power supply unit includes a pump unit for supplying a solid fuel to the top drone, and the top drone has a solid rocket engine configured to combust the solid fuel to generate a thrust.

In a preferred aspect of the present invention, the power supply unit includes a pump unit or a compressor for supplying a pressurized fluid to the top drone, and the top drone has an injection nozzle configured to inject the pressurized fluid to generate a thrust.

In a preferred aspect of the present invention, the fire fighting system further comprises: at least one relay drone coupled to a midway of the fire hose; and a relay cable coupled to the relay drone, wherein the top drone and the relay drone are connected in series by the wired cable and the relay cable, and the power or the fuel for flying the top drone and the relay drone is supplied from the power supply unit through the wired cable and the relay cable.

In a preferred aspect of the present invention, the fire fighting system further comprises: a booster pump disposed in a middle of the fire hose, wherein the relay drone is coupled to the booster pump.

In a preferred aspect of the present invention, the fire fighting system further comprises: at least one auxiliary drone which is coupled to the fire hose in order to adjust an attitude of the fire hose; and an auxiliary wired cable coupled to the auxiliary drone, wherein the top drone and the auxiliary drone are connected in series by the auxiliary cable, and the power or the fuel for flying the auxiliary drone is supplied from the power supply unit through the wired cable and the auxiliary wired cable.

In a preferred aspect of the present invention, the nozzle has a T-shape having a first branch pipe, a second branch pipe, and a third branch pipe, the first branch pipe and the second branch pipe branch from the third branch pipe, and extend in opposite directions to each other, and the fire extinguishing liquid flows into the third branch pipe, and is injected from the first branch pipe and the second branch pipe.

In a preferred aspect of the present invention, the top drone has an ejection unit for ejecting an anchor.

In a preferred aspect of the present invention, the top drone has a solar cell panel disposed therein, and the solar cell panel supplies at least part of power for actuating the ejection unit, to the ejection unit.

In a preferred aspect of the present invention, the top drone has an engagement hook, and the engagement hook has a claw that can be engaged with a rod-shaped member.

In a preferred aspect of the present invention, the fire-extinguishing-liquid supply source is a water supply system, the water supply system includes at least one pump and a water supply pipe extending from the pump, and the fire hose has an attachment member provided on an terminal end thereof, which can be coupled to the water supply system.

In a preferred aspect of the present invention, the fire fighting system further comprises a connecting pipe or a connecting hose for coupling the attachment member to the water supply system.

In a preferred aspect of the present invention, the attachment member has a hose-side connecter for coupling the attachment member to a water-supply-side connector provided on a branch pipe of the water supply system, and a counterweight for maintaining a horizontal attitude of the hose-side connector is attached to the attachment member.

In a preferred aspect of the present invention, the attachment member has an on-off valve for opening and closing a flow path formed therein.

In a preferred aspect of the present invention, the attachment member has T-shape constructed of a first branch section, a second branch section, and a third branch section, the first branch section and the second branch section branch the third branch section to which the fire hose is coupled, and extend in opposite directions to each other, and on-off valves are disposed in the first branch section and the second branch section, respectively.

In a preferred aspect of the present invention, the attachment member is configured as a drone including a thrust generation mechanism.

In a preferred aspect of the present invention, the attachment member is coupled to the relay drone.

Advantageous Effects of Invention

According to the present invention, the top drone to which the nozzle of the fire hose is coupled is constantly supplied with power or fuel from the power supply unit through a wired cable, so that the top drone has no restrictions on flight time. Therefore, the top drone can be flown until the fire is completely extinguished.

DESCRIPTION OF EMBODIMENTS

Figure 1:
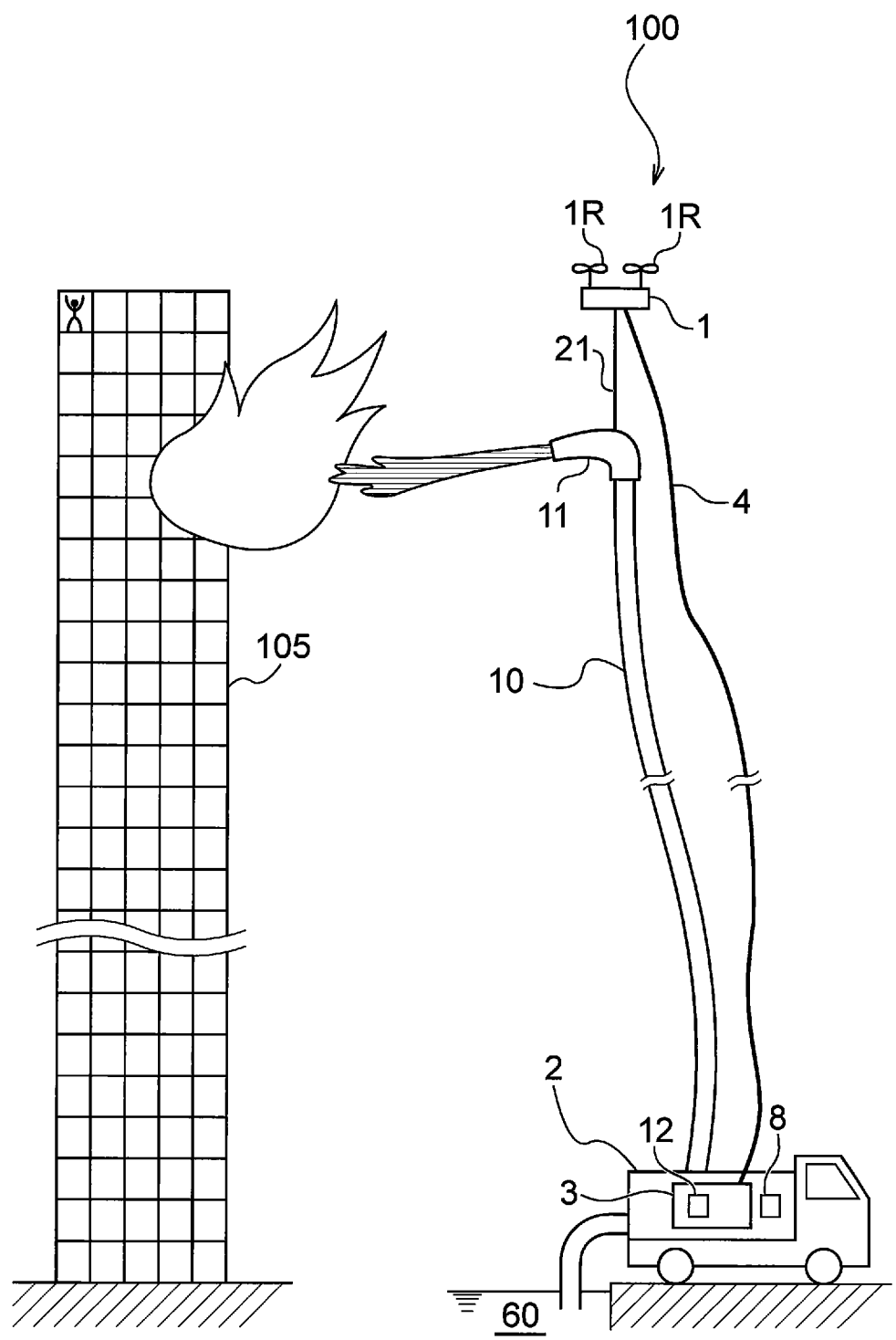
FIG. 1 is a schematic view showing a state in which a fire occurring in a high-rise building is been extinguishing by using a fire fighting system according to an embodiment.

Embodiments according to the present invention will be described with reference to the drawings. In FIGS. 1 through 17, identical or corresponding components are denoted by identical reference numerals, and repetitive descriptions thereof will be omitted.

FIG. 1 is a schematic view showing a state in which a fire occurring in a high-rise building is been extinguishing by using a fire fighting system according to an embodiment. The fire fighting system 100 shown in FIG. 1 is used to extinguish a fire in a high-rise building 105, such as a skyscraper.

As shown in FIG. 1, the fire fighting system 100 includes a fire hose 10 having a nozzle 11 for injecting a fire extinguishing liquid, a fire truck (a fire-fighting-liquid supply source) 2 coupled to the fire hose 10, a top drone 1 coupled to the nozzle 11, a wired cable 4 coupled to the top drone 1, and a power supply unit 3 that supplies power or fuel to the top drone 1 through the wired cable 4 to fly the top drone 1. In this embodiment, one end of the wired cable 4 is coupled to the top drone 4 and the other end of the wired cable 4 is coupled to the power supply unit 3.

The fire truck 2 shown in FIG. 1 serves as a fire-extinguishing-liquid supply source that supplies the fire extinguishing liquid to the fire hose 10. The fire truck 2 has a pump (not shown) for pumping the fire extinguishing liquid. Examples of the fire extinguishing liquid include water, and chemical fire extinguishant. In this embodiment, the fire extinguishing liquid is water stored in the water storage tank 60. When the fire extinguishing liquid is water, the fire truck 2 may have a tank for storing water, or may be coupled to a fire hydrant (not shown). When the fire extinguishing liquid is chemical fire extinguishant, the fire truck 2 has a tank for storing chemical fire extinguishant.

Although not shown, a liquid feeding apparatus for supplying the fire extinguishing liquid to the fire hose 10 may be located outside (e.g., in the vicinity) of the fire truck 2, and the liquid feeding apparatus may be coupled to the fire truck 2. Such liquid feeding apparatus is, for example, a pumping apparatus capable of pumping water stored in the water storage tank 60. Alternatively, the fire truck 2 may be omitted, and the liquid feeding apparatus, such as the pumping apparatus, may be directly connected to the water storage tank 60, or the fire hydrant. When the fire truck 2 is omitted, the liquid feeding apparatus is used as the fire-extinguishing-liquid supply source, and the above-mentioned power supply unit 3 and the above-mentioned controller 8 are preferably located in the vicinity of the liquid feeding apparatus.

The top drone 1 is coupled to the nozzle 11 of the fire hose 10 through a hanging tool 21, such as a wire. The top drone 1 has rotary blades 1R, and the rotary blades 1R serve as a thrust generation mechanism to generate thrust for flying the top drone 1. In one embodiment, the hanging tool 21 may be omitted, and the nozzle 11 may be connected directly to the top drone 1. The power supply unit 3 includes a power source 12, and is configured to supply power for rotating the rotary blades 1R of the top drone 1, to the top drone 1 through a wired cable 4 from the power source 12. The rotary blades 1R of the top drone 1 are rotated by the power supplied from the power supply unit 3 through the wired cable 4, thereby allowing the top drone 1 to fly.

The type of power source 12 of the power supply unit 3 is freely-selected, and all kinds of power source, such as a battery, a storage battery, a condenser, and a fuel cell, can be mounted on the power supply unit 3. In the illustrated example, the power supply unit 3 is mounted on the fire truck 2. In one embodiment, a commercial power source (not shown) may be connected to the power supply unit 3. In this case, the power supplied from the commercial power source is supplied to the top drone 1 through the power supply unit 3 and the wired cable 4. Alternatively, a power generation unit (not shown) may be installed, and power may be supplied from the power generation unit to the power supply unit 3.

In the illustrated example, the power supply unit 3 is housed in the fire truck 2. However, the present embodiment is not limited to this example. Specifically, the power supply unit 3 may be disposed outside of the fire truck 2 (e.g., in the vicinity of the fire truck 2). In this case, a power generating unit disposed in the vicinity of the fire truck 2 may be used as the power supply unit 3.

Further, the fire fighting system 100 has a controller 8 configured to control operations of the top drone 1 and operations of the power supply unit 3. The controller 8 may be a controller maneuvered by a human operator, or a computer storing a program for controlling the operations of the top drone 1. In this embodiment, the top drone 1 operates wirelessly based on control signals transmitted from the controller 8. In one embodiment, the controller 8 may transmit the control signals to the top drone 1 through the wired cable 4. In the illustrated example, the controller 8 is also housed in the fire truck 2. In one embodiment, the controller 8 may be disposed outside of the fire truck 2 (e.g., in the vicinity of the fire truck 2).

Although not shown, the top drone 1 may have rotors that rotates by electric power, instead of the rotary blades 1R. In this case, the rotors serve as the thrust generation mechanism to generate the thrust for flying the top drone 1. The power to rotate the rotors is supplied from the power supply unit 3 to the top drone 1 through the wired cable 4.

According to the fire fighting system 100 shown in FIG. 1, when a fire occurs in the high-rise building 105, such as skyscraper, the nozzle 11 of the fire hose 10 coupled to the top drone 1, which is an unmanned mobile, can be transported to the vicinity of the location in which the fire has been occurring. Therefore, fire fighting activities can be carried out safely and quickly. Furthermore, since the top drone 1 is constantly supplied with power from the power supply unit 3 through the wired cable 4, it is unnecessary to mount the power source on the top drone 1. Therefore, the top drone 1 has no restrictions on flight time, so that the top drone 1 can be flown until the fire is completely extinguished.

Figure 2:
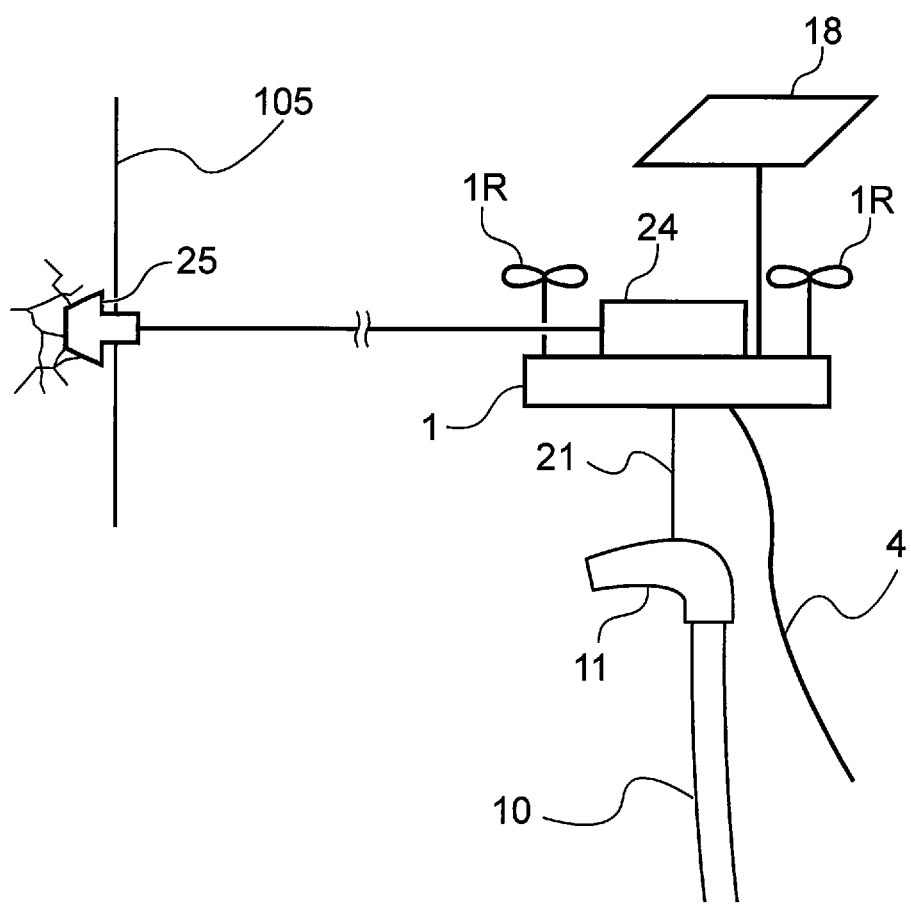
FIG. 2 is a schematic view showing a modification of a top drone.

FIG. 2 is a schematic view showing a modification of the top drone 1. In FIG. 2, a part of the high-rise building 105 shown in FIG. 1 is illustrated. As shown in FIG. 2, the top drone 1 may include an ejection unit 24 for ejecting an anchor 25. The ejection unit 24 allows the anchor 25 to be shot at a wall of the high-rise building 105.

When the fire extinguishing liquid is injected from the nozzle 11, the fire hose 10 is subjected to a force in an opposite direction to a direction of injection of the fire extinguishing liquid. Therefore, the fire hose 10 tends to move in the opposite direction to the direction of injection of the fire extinguishing liquid. In this embodiment, the anchor 25 is ejected from the ejection unit 24 toward the wall of the high-rise building 105 and struck into the wall of the high-rise building 105. The anchor 25 struck into the wall of the high-rise building 105 prevents the fire hose 10 coupled to the top drone 1 from moving. As a result, an attitude of the fire hose 10 when the fire extinguishing liquid is being injected from the nozzle 11 is maintained, enabling the fire extinguishing liquid to be released to a desired extinguishing position.

As shown in FIG. 2, the top drone 1 may have a solar cell panel 18. Electric power generated by the solar cell panel 18 can be used as power to operate the ejection unit 24. In this manner, arrangement of the solar cell panel 18 on the top drone 1 allows all or part of the electric power required for the ejection mechanism 24 mounted on the top drone 1 to be covered with the electric power generated by the solar cell panel 18.

Figure 3:
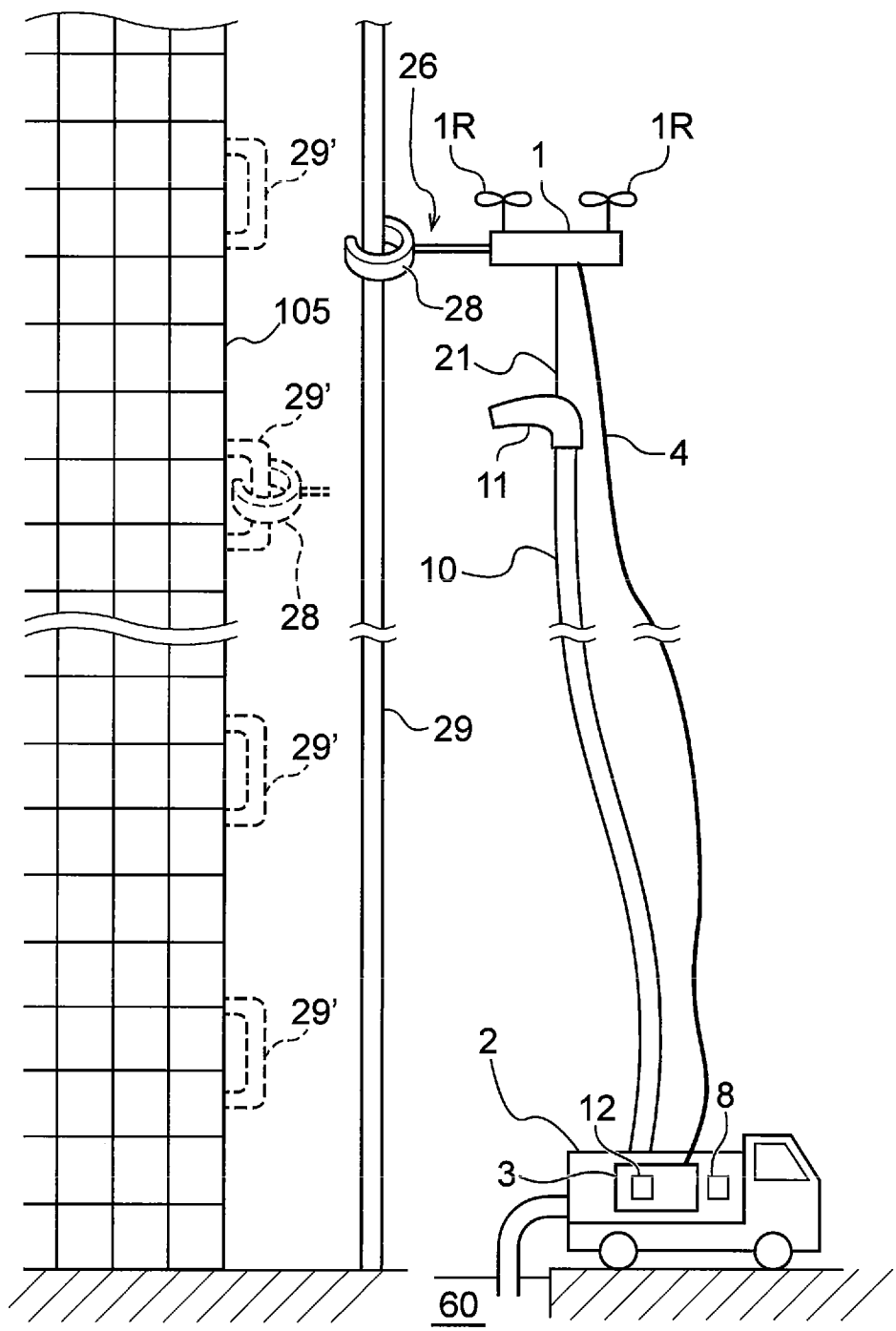
FIG. 3 is a schematic view showing another modification of the top drone.

FIG. 3 is a schematic view showing another modification of the top drone 1. The top drone 1 shown in FIG. 3 includes an engagement hook 26, instead of the ejection mechanism 24. The engagement hook 26 has a claw 28 that can be engaged with a rod-shaped member 29 arranged adjacent to the high-rise building 105. As shown by a virtual line (dotted line) in FIG. 3, a rod-shaped member 29' with which the claw 28 of the engagement hook 26 can be engaged may be fixed to the high-rise building 105. In FIG. 3, an example of a rod-shaped member 29' fixed to the high-rise building 105 is illustrated. This rod-shaped member 29' has a shape bent in a substantially U-shape, and is fixed to the wall of the high-rise building 105. It is preferable to fix a plurality of rod-shaped members 29' to the wall of the high-rise building 105. Although, in the example shown in FIG. 3, the plurality of rod-shaped members 29' are arranged at equal intervals along the outer wall of the high-rise building 105, the mounting position of each rod-shaped member 29' in the high-rise building 105 can be freely-selected. Engagement of the claw 28 of the engagement hook 26 with the rod-shaped member 29 (or 29') prevents the top drone 1 from moving in the horizontal direction, so that movement of the fire hose 10 when the fire extinguishing liquid is injected from the nozzle 11 can be prevented.

Although not shown, the claw 28 of the engagement hook 26 may be configured as an electric claw that can be opened and closed by electric power. In this case, the engagement hook 26 is connected to the controller 8 (see FIG. 1), and the controller 8 is configured to control opening and closing operation of the claw 28 of the engagement hook 26. Further, the electric power to open and close the claw 28 is supplied from the power supply unit 3 through the wired cable 4. The controller 8 controls the opening and closing operation of the claw 28 such that the claw 28 grasps the above-mentioned the rod-shaped member 29 (or 29'). In one embodiment, the controller 8 may control the opening and closing operation of the jaws 28 to grasp an engaging member (not shown), such as an eyebolt or a fence, which is provided on a wall of the high-rise building 105. When the top drone 1 has the above-mentioned solar cell panel 18 (see FIG. 2), all or part of the power to operate the claw 28 of the engagement hook 26 can be covered by the electric power generated by the solar cell panel 18.

Figure 4:
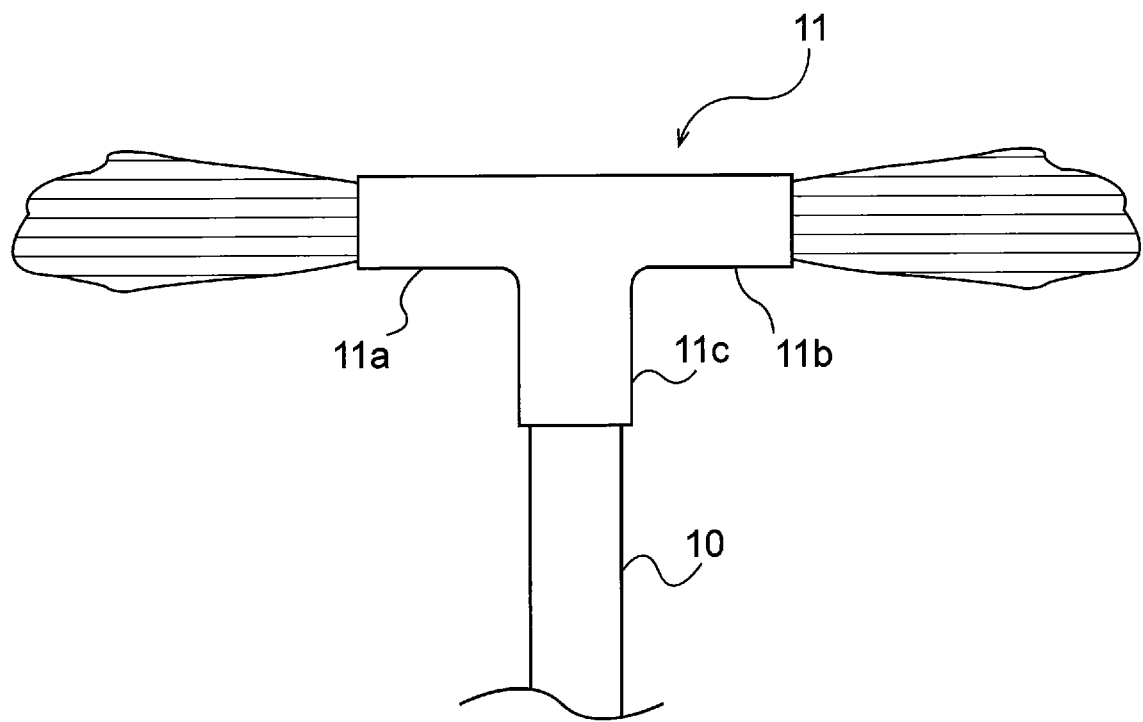
FIG. 4 is a schematic view showing a modification of the nozzle of the fire hose.

FIG. 4 is a schematic view showing a modification of the nozzle of the fire hose. The nozzle 11 shown in FIG. 4 has a T-shape having a first branch pipe 11a, a second branch pipe 11b, and a third branch pipe 11c. The first branch pipe 11a and the second branch pipe 11b branch from the third branch pipe 11c and extend in opposite directions to each other. The fire extinguishing liquid flowing through the fire hose 10 from the fire truck 2 (see FIG. 1), which is the fire extinguishing liquid supply source, flows into the third branch pipe 11c, and is injected from the first branch pipe 11a and the second branch pipe 11b. The fire extinguishing liquid injected from the first branch pipe 11a is directed to the location where the fire has occurred. A force applied to the fire hose 10 when the fire extinguishing liquid is injected from the first branch pipe 11a is offset by a force generated by injecting the fire extinguishing liquid from the second branch pipe 11b. Therefore, it is possible to prevent the fire hose 10 from moving when the fire extinguishing liquid is injected from the nozzle 11.

Figure 5:
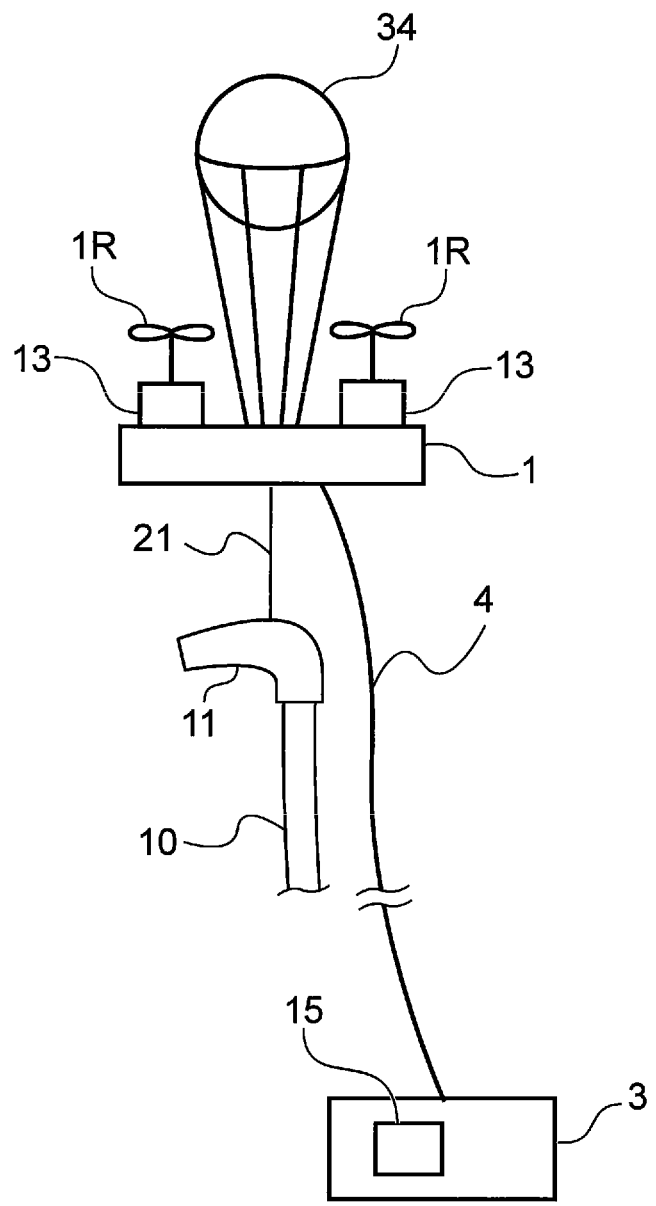
FIG. 5 is a schematic view showing still another modification of the top drone.

FIG. 5 is a schematic view showing still another modification of the top drone 1. The top drone 1 shown in FIG. 5 has an internal-combustion engine 13 for rotating the rotary blades 1R. The power supply unit 3 includes a pump unit 15 for supplying fuel to the internal-combustion engine 13 of the top drone 1. The fuel supplied through the wired cable 4 by the pump unit 15 is burned in the internal-combustion engine 13, and the internal-combustion engine 13 rotates the rotor blades 1R. With this structure, the rotor blades 1R can generate thrust for flying the top drone 1. The top drone may have rotors rotated by the internal-combustion engine 13, instead of the rotor blades 1R.

As shown in FIG. 5, a balloon 34, which is an auxiliary aircraft, may be coupled to the top drone 1. The balloon 34 can apply a force upward in a vertical direction to the top drone 1. Therefore, The balloon 34 can reduce the weight of the fire hose 10 borne by the top drone 1. An airship (not shown) may be used as an auxiliary aircraft.

Figure 6:
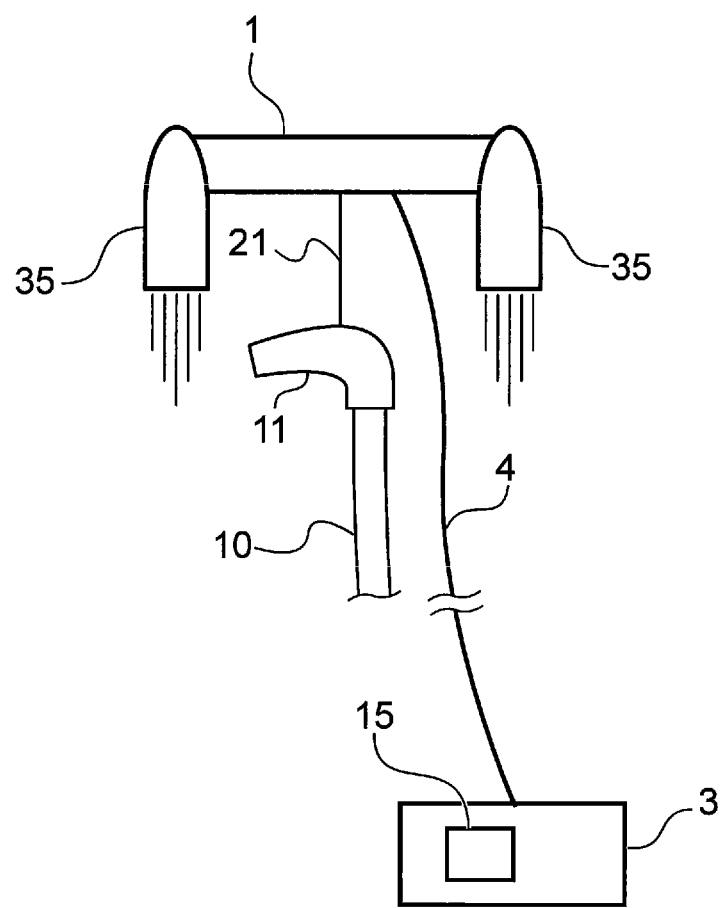
FIG. 6 is a schematic view showing still another modification of the top drone.

FIG. 6 is a schematic view showing still another modification of the top drone 1. The top drone 1 shown in FIG. 6 has engines 35, instead of the rotor blades 1R. The engines 35 are used as the thrust generation mechanism that generates the thrust for flying the top drone 1. Each engine 35 may be a jet engine using jet fuel, a gas rocket engine using a mixture fuel of gas fuel and gas oxidizer, or a solid rocket engine using a solid fuel containing a mixture of fuel and oxidizer. When the top drone 1 has the engines 35 used as a thrust generator, the power generator 3 includes a pump unit 15 for supplying fuel to the engines 35.

When the engines 35 are the jet engine, the pump unit 15 of the power supply unit 3 supplies the jet fuel to the top drone 1 through the wired cable 4. The jet fuel supplied from the power supply unit 3 to the engines 35 through the wired cable 4 is mixed with air in each engine 35 and combusted. As a result, the thrust for flying the top drone 1 is generated.

When the engines 35 are the gas rocket engine, the pump unit 15 of the power supply unit 3 supplies a gas fuel (for example, hydrogen gas) and a gas oxidizer (for example, oxygen gas) to the top drone 1 through the wired cable 4 respectively. The gas fuel and the gas oxidizer supplied by the pump unit 15 of the power supply unit 3 are mixed and combusted in each of the gas rocket engines. As a result, the thrust for flying the top drone 1 is generated.

When the engines 35 are the solid rocket engine, the pump unit 15 of the power supply unit 3 supplies the solid fuel, having the form of powder or fine pellets, to the top drone 1 through the wired cable 4. More specifically, the pump unit 15 is configured to pump a gas, such as air containing the solid fuel having the form of powder or fine pellets, to the engine 35 through the wired cable 4. The solid fuel supplied by the pump unit 15 of the power supply unit 3 is combusted in each of the solid rocket engines. As a result, the thrust for flying the top drone 1 is generated.

Figure 7:
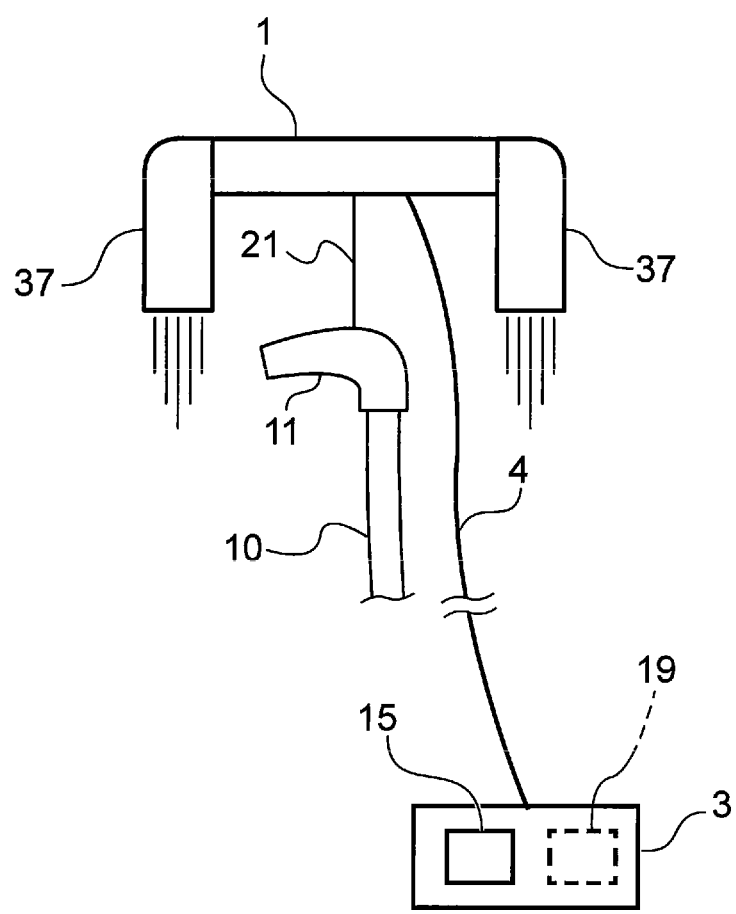
FIG. 7 is a schematic view showing still another modification of the top drone.

FIG. 7 is a schematic view showing still another modification of the top drone 1. The top drone 1 shown in FIG. 7 has injection nozzles 37 that inject a pressurized fluid (for example, compressed air, or pressurized water) downward, instead of the rotor blades 1R. The injection nozzles 37 serve as the thrust generation mechanism for generating the thrust for flying the top drone 1. The power supply unit 3 supplies the pressurized fluid to the top drone 1 through the wired cable 4 to inject the pressurized fluid from the injection nozzles 37. By injecting the pressurized fluid downward from the injection nozzles 37, the thrust for flying the top drone 1 is generated. Specifically, the power supply unit 3 supplies the pressurized fluid to the injection nozzles 37 of the top drone 1 as the power for flying the top drone 1.

When the fluid injected from the injection nozzles 37 is a liquid such as pressurized water, the power supply unit 3 includes the pump unit 15 that pumps this liquid to the top drone 1 through the wired cable 4. The liquid supplied from the pump unit 15 to the top drone 1 through the wired cable 4 is injected downward from each of the injection nozzles 37, and thus the thrust for flying the top drone 1 is generated. When the fluid injected from the injection nozzles 37 is a gas such as compressed air, the power supply unit 3 includes a compressor 19. The gas compressed by the compressor 19 is supplied to the top drone 1 through the wired cable 4m and injected from each of the injection nozzles 37.

Figure 8:
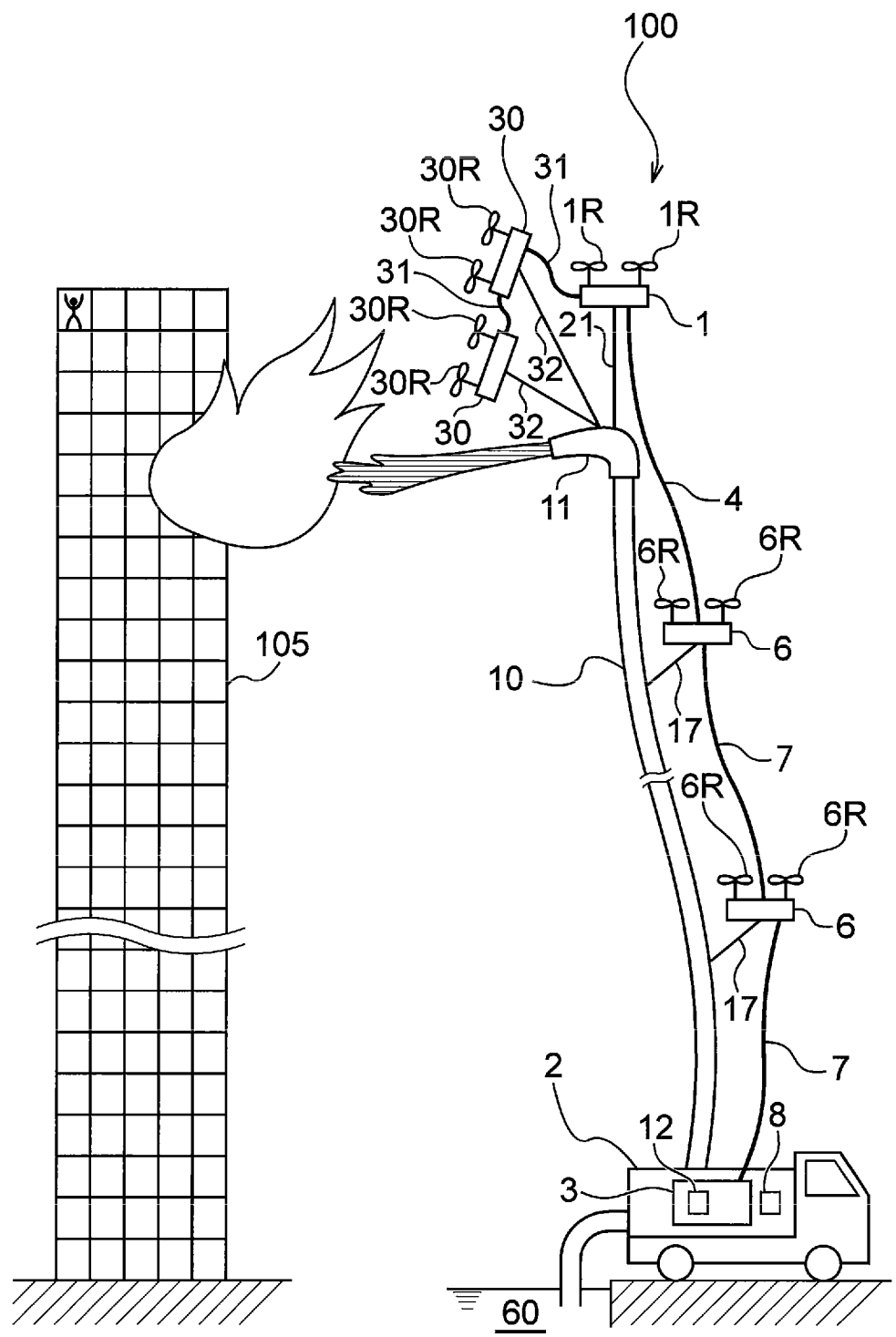
FIG. 8 is a schematic view showing a state in which a fire occurring in a high-rise building is been extinguishing by using the fire fighting system according to another embodiment.

FIG. 8 is a schematic view showing a state in which a fire occurring in a high-rise building is been extinguishing by using the fire fighting system 100 according to another embodiment. The construction of this embodiment, not particularly described here, is the same as the construction shown in FIG. 1, and a duplicate description thereof will be omitted.

The fire extinguishing system 100 shown in FIG. 8 includes the top drone 1 coupled to the nozzle 11 of the fire hose 10, and at least one (two in FIG. 8) relay drone 6. Each relay drone 6 is coupled to the midway of the fire hose 10 through a coupling tool 17, such as a wire.

A relay cable 7 is coupled to each relay drone 6. The top drone 1 and the relay drone 6 are coupled in series by the wired cable 4 and the relay cables 7. More specifically, the top drone 1 and the relay drone 6 adjacent to the top drone 1 are coupled by the wired cable 4, and the adjacent relay drones 6 are coupled to each other by the relay cable 7. The relay cable 7 coupled to the relay drone 6 located at the lowermost side (that is, the relay drone 6 adjacent to the power supply unit 3) is coupled to the power supply unit 3. In such a configuration, the top drone 1 and at least one relay drone 6 are connected in a chain-like manner by the wired cable 4 and at least one relay cable 7.

Each relay drone 6 has rotary blades 6R, and the rotary blades 6R serves as a thrust generation mechanism for generating a thrust for flying the relay drone 6. The power for flying the top drone 1 and the relay drones 6 is supplied from the power supply unit 3 through the wired cable 4 and the relay cables 7. More specifically, the power for flying the top drone 1 is supplied from the power supply unit 3 through the wired cable 4 and the relay cables 7, and the power for flying each relay drone 6 is supplied from the supply unit 3 through the relay cables 7.

In this embodiment, each relay drone 6 operates wirelessly based on control signals transmitted from the controller 8. In one embodiment, the controller 8 may transmit the control signals to each relay drone 7 through the relay cables 7.

The controller 8 is configured to control the operations of the top drone 1 and the operations of each relay drone 6 independently of each other. Therefore, the controller 8 can make the top drone 1 and the relay drone 6 connected in series by the wired cable 4 and the relay cable 7 function as if they comprise a single multijointed robot arm. Accordingly, the fire hose 10, the wired cable 4, and the relay cables 7 are not caught or entangled with a natural object (for example, a tree) or an artificial object (for example, an electric wire).

According to the fire fighting system 100 configured in this manner, the controller 8 controls the flight operations of the top drone 1 and each relay drone 6, allowing the nozzle 11 of the fire hose 10 to reach the vicinity of the place where the fire has been occurring. The fire extinguishing liquid (for example, water, or chemical fire extinguishant) is injected from the nozzle 11 of the fire hose 10 that has reached the vicinity of the place where fire has been occurring, and thus the fire fighting activities are carried out.

Further, in this embodiment, since each relay drone 6 flies while bearing a part of weight of the fire hose 10, the weight of the fire hose 10 borne by the top drone 1 is reduced. More specifically, the weight of the fire hose 10 borne by the top drone 1 is the weight of a part of the fire hose 10 lying between the top drone 1 and the relay drone 6 adjacent to the top drone 1. Further, the weight of the fire hose 10 borne by each relay drone 6 is the weight of a part of the fire hose 10 lying between the adjacent relay drones 6. Therefore, increasing the number of relaying drones 6 can eliminate the limitation of high-rise floor that the top drone 1 (i.e., nozzles 11 of the fire hose 10) can reach. In other words, by increasing the number of relay drones 6 in accordance with the height of the place where fire has been occurring, the height at which the top drone 1 is reachable can be adjusted.

Further, the power is supplied to the top drone 1 and the relay drones 6 from the power source 12 of the power supply unit 3 through the wired cable 4 and the relay cables 7. Therefore, the top drone 1 and the relay drones 7 during the fire fighting activities have no restriction on the flight time. As a result, the top drone 1 and the relay drones 6 can be flown until the fire is completely extinguished.

Although not shown, each relay drone 6 may have an internal-combustion engine for rotating the rotary blades 6R. Further, the balloon 34 (see FIG. 5) or the airship may be coupled to the relay drone 6. Further, the relay drone 6, instead of the rotary blades 6R, may have the engine 35 described with reference to FIG. 6 or the injection nozzles 37 described with reference to FIG. 7.

The thrust generator of the top drone 1 and the thrust generator of the relay drone 6 may be different from each other. For example, the thrust generator of the top drone 1 may be the above-mentioned engine 35 in which the fuel is combusted, while the thrust generator of each relay drone 6 may be the rotor blades 6R which are rotated by electric power. In this case, the power supply unit 3 is configured to include the pumping unit 15 for supplying fuel to the engine 35 of the top drone 1, and the power source 12 for supplying electric power to the rotary blades 6R of each relay drone 6. Further, each relay drone 6 may have the same thrust generator, or may have the different thrust generators. For example, the thrust generators of some of the relay drones 6 may be the above-mentioned engine 35 in which the fuel is combusted, while the thrust generators of the remaining relay drones 6 may be the above-mentioned injection nozzle 37 for injecting pressurized fluid. In this case, the power supply unit 3 is configured to include a pump unit 15 for supplying fuel to the engines 35 of some of the relay drones 6, and another pump unit 15 or the compressor 19 for supplying pressurized gas to the remaining relay drones 6.

As shown in FIG. 8, the fire fighting system 100 may include at least one (in FIG. 8, two) auxiliary drones 30. In this case, the firefighting system 100 includes a main drone group having the top drone 1 and the relay drones 6 coupled in series by the wired cable 4 and the relay cables 7, and a sub-drone group which is branched at the middle of the main drone group, the sub-drone group having at least one (two in FIG. 2) auxiliary drone 30 coupled in series by auxiliary cables 31.

Each auxiliary drone 30 is coupled to the nozzle 11 of the fire hose 10 through a coupling tool 32, such as a wire. The controller 8 controls the flight operations of the top drone 1 and the relay drones 6, as well as the flight operations of the auxiliary drones 30.

In this embodiment, each auxiliary drone 30 has rotary blades 30R serving as a thrust generating mechanism. The electric power for rotating the rotary blades 30R of each auxiliary drone 30 is supplied to each auxiliary drone 30 through the relay cables 7, the wired cable 4, and the auxiliary wired cable 31.

The auxiliary drones 30 are coupled to the fire hose 10 in order to control the attitude of the fire hose 10 coupled to the top drone 1. As described above, when the fire extinguishing liquid is injected from the nozzle 11, the force is subjected to the fire hose 10 in the direction opposite to the direction of injection of the fire extinguishing liquid. During injection of the fire extinguishing liquid, the controller 8 causes the auxiliary drones 30 to fly such that the auxiliary drones 30 pull the nozzle 11 of the fire hose 10 in the direction of injection of the fire extinguishing liquid. This operation prevents the fire hose 10 from moving when injecting the fire extinguishing liquid, so that the attitude of the fire hose 10 is maintained and the fire extinguishing liquid can be injected at a desired fire extinguishing position.

Although not shown, the auxiliary drone 30 may have the internal-combustion engine for rotating the rotor blades 30R. Further, the balloon 34 (see FIG. 5) or airship may be coupled to the auxiliary drone 30. Further, the auxiliary drone 30, instead of the rotary blades 6R, may have the engine 35 described with reference to FIG. 6 or the injection nozzles 37 described with reference to FIG. 7. Each auxiliary drone 30 may have the same thrust generator, or may have the different thrust generators As shown in FIG. 8, in a case where the fire fighting system 100 has the main drone group and the sub-drone group, the thrust generator of the top drone 1, the thrust generator of each relay drone 6, and the thrust generator of each auxiliary drone 30 may be different from each other.

Figure 9:
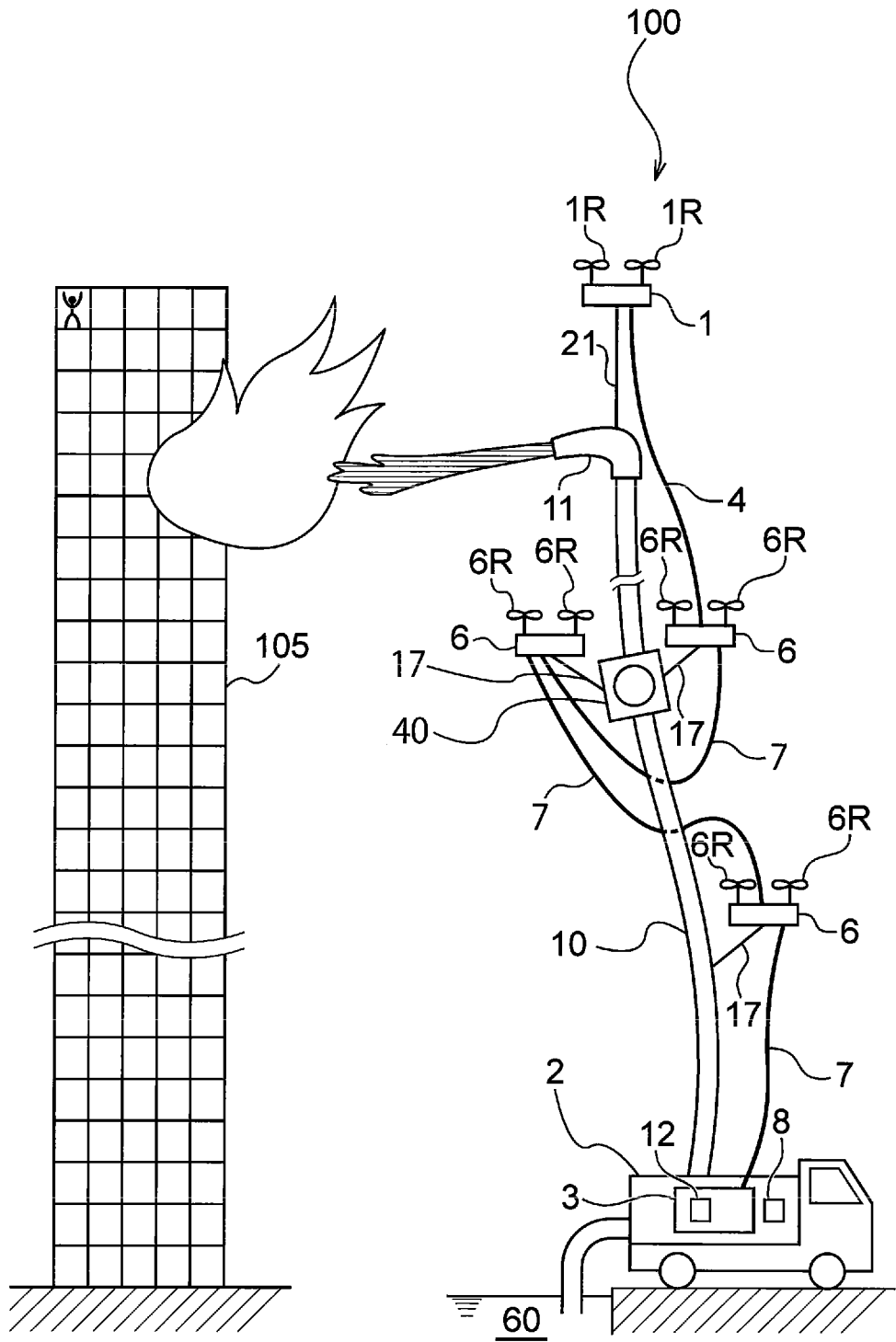
FIG. 9 is a schematic view showing a state in which a fire occurring in a high-rise building is been extinguishing by using the fire fighting system according to still another embodiment.

FIG. 9 is a schematic view showing a state in which a fire occurring in a high-rise building is been extinguishing by using the fire fighting system 100 according to still another embodiment. The construction of this embodiment, not particularly described here, is the same as the construction shown in FIG. 1, and a duplicate description thereof will be omitted.

In the fire fighting system 100 shown in FIG. 9, a booster pump (a relay pump) 40 is disposed in the middle of the fire hose 10. The booster pump 40 is used to increase a pressure of the fire extinguishant flowing through the fire hose 10. Although, in the illustrated example, one booster pump 40 is disposed in the middle of the fire hose 10, a plurality of booster pumps 40 may be disposed in the middle of the fire hose 10.

In the illustrated example, two of the plurality of relay drones 6 are coupled to the booster pump 40 through the coupling tool 17, such as a wire, respectively. The number of relay drones 6 coupled to the boosting pump 40 may be one or three or more.

As described above, the controller 8 controls the operations of the top drone 1 and the operations of each relay drones 6 independently of each other. Therefore, as shown in FIG. 9, it is possible to make the plurality of relay drones 6 connected in series by the relay cables 7 function as if they comprise a single multijointed robot arm.

A weight of the booster pump 40 is borne by at least one relay drone 6. Provision of the booster pump 40 enables a size of the pump (not shown) mounted on the fire truck 2 and pumping the fire extinguishing liquid to be reduced. Further, a pressure of the fire extinguishing liquid flowing through the fire hose 10 can be reduced compared to a case where the fire extinguishing liquid is pumped by one pump mounted on the fire truck 2. As a result, a pressure resistance performance of the fire hose 10 can be reduced, and thus an inexpensive and lightweight fire hose 10 can be used.

Although not shown, the fire fighting system shown in FIG. 9 may have the auxiliary drones 30 described with reference to FIG. 8. In this case, the auxiliary drones 30 control the attitude of the fire hose 10 coupled to the top drone 1. Alternatively, instead of the auxiliary drones 30, the nozzle 11 of the fire hose 10 may have the T-shape described with reference to FIG. 4.

Figure 10:
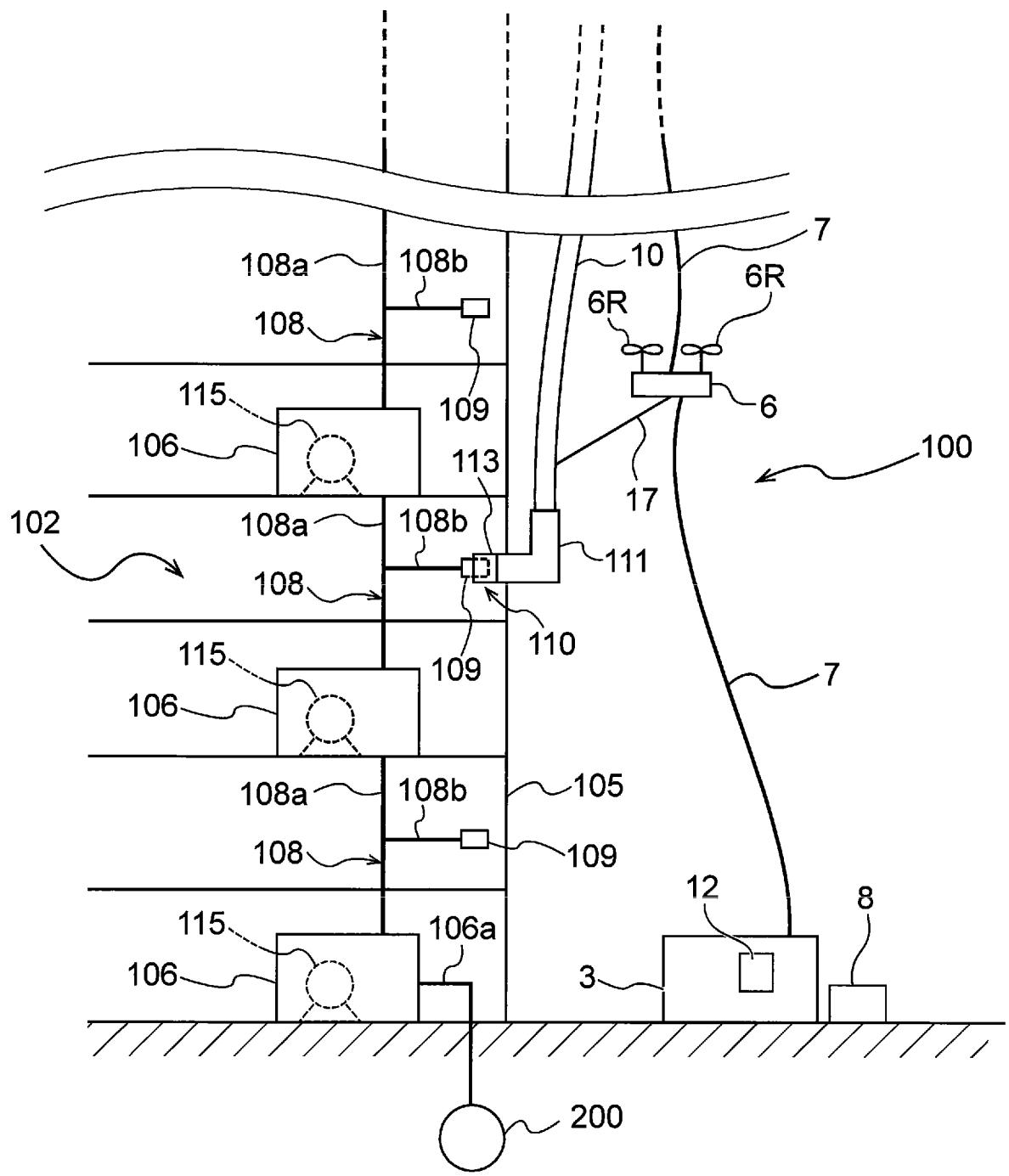
FIG. 10 is a schematic view showing a portion of the fire fighting system according to still another embodiment.

FIG. 10 is a schematic view showing a portion of the fire fighting system 100 according to still another embodiment. More specifically, FIG. 10 illustrates a portion of the fire fighting system 100 from the fire extinguishing liquid supply source to the end of the fire hose. The construction of this embodiment, not particularly described here, is the same as the construction of the above-described embodiments, and a duplicate description thereof will be omitted.

In the embodiment shown in FIG. 10, a water supply system 102 disposed in the high-rise building 105 where the fire has been occurring serves as the fire extinguishing liquid supply source 2 described above. More specifically, the fire hoses 10 coupled to at least one drone 1, 6 is coupled to the water supply system 102, and thus water, which is fire fighting liquid, is supplied from the water supply system 102 to the fire hoses 10.

Hereinafter, an example of coupling the fire hose 10 to a water supply system 102 disposed in the high-rise building 105 where the fire has been occurring will be described. However, this embodiment is not limited to this example. In one embodiment, the fire hose 10 may be coupled to a water supply system disposed in a different building (e.g., a building adjacent to the high-rise building 105) from the high-rise building 105 where the fire has been occurring.

The water supply system 102 includes a plurality of water supply units 106, and water pipes 108 extending from each water supply unit 106. In FIG. 10, a plurality of (three) water supply units 106, which are disposed in a plurality of floors respectively, are illustrated. However, the number of water supply units 106 is not limited to this example. The water supply system 102 may have only one water supply unit 106. In other words, the water supply system 102 may have at least one water supply unit 106.

Each water supply unit 106 has a water supply pump 115 fort increasing a pressure of water flowing through the water supply unit 106. When the water supply system 102 has the plurality of water supply units 106, the adjacent water supply units 106 are linked by a water supply pipe 108. Each water supply pipe 108 has a main pipe 108a and a branch pipe 108b branched from the main pipe 108a. The water supply unit 106 located at the lowermost side has an inlet pipe 106a coupled to the water pipe 200, and water flowing through the water pipe 200 is sucked into the water supply unit 106, located at the lowermost side, through the inlet pipe 106a. Such water supply system 102 is, for example, a drinking water supply system that supplies drinking water into the high-rise building 105. The water supply system 102 may be a sprinkler system disposed in the high-rise building 105.

The branch pipe 108b has a water-supply-side connector 109 formed at an end thereof. An attachment member 111 is provided at a terminal end of the fire hose 10, and the attachment member 111 has a hose-side connector 113 configured to be detachable from the water-supply-side connector 109 of the branch pipe 108b. The water-supply-side connector 109 of the branch pipe 108b and the hose-side connector 113 of the attachment member 111 serve as a joint 110 that couples the fire hose 10 to the branch pipe 108b of the water supply pipe 108. Examples of the joint 110 include a screw-in joint and a one-touch joint.

When the joint 110 is the one-touch joint, the fire hose 10 is coupled to the branch pipe 108b via the attachment member 111 by simply inserting the hose-side connector 113 into the water-supply-side connector 109. Accordingly, the fire hose 10 can be quickly coupled to the branch pipe 108b of the water supply pipe 108 (i.e., the water supply system 102, which is the supply source of the fire extinguishing liquid).

In this embodiment, the attachment member 111 has an L-shaped cross-sectional shape. The hose-side connector 113 is arranged at one end (i.e., a tip portion) of the attachment member 111, and the other end (i.e., a terminal portion) is coupled to the fire hose 10. The attachment member 111 has a flow path (not shown) formed therein, through which water supplied from the water supply pipe 108 of the water supply system 102 flows. Therefore, when the hose-side connector 113 of the attachment member 111 is coupled to the water-supply-side connector 109 provided at the end of the branch pipe 108b, the fire hose 10 is in communication with the water supply pipe 108 of the water supply system 102 through the attachment member 111. This allows water as a fire extinguishing liquid to be supplied from the water supply system 102 to the fire hose 10.

As shown in FIG. 10, the power supply unit 3 and the controller 8 described above are located on the ground. Although, in FIG. 10, only the relay drone 6 arranged at the lowermost end is illustrated. the fire hose 10 is coupled to the plurality of drones 1, 6. The plurality of drones 1, 6 are supplied with power from the power source 12 of the power supply unit 3 through the wired cable 4 and the relay cables 7. Therefore, the top drone 1 and the relay drones 7 during the fire fighting activities have no restriction on the flight time. As a result, the top drone 1 and the relay drones 6 can be flown until the fire is completely extinguished. Furthermore, the fire hose 10 coupled to the water supply system 102 can be supplied with water (fire extinguishing liquid) flowing through the water pipe 200. Therefore, theoretically, there is no limit to the amount of water supplied to the fire hose 10.

Further, the fire fighting system shown in FIG. 10 may have the auxiliary drones 30 described with reference to FIG. 8, or may have the booster pump (relay pump) 40 disposed in the middle of the fire hose 10, which is described with reference to FIG. 9.

Figure 11A:
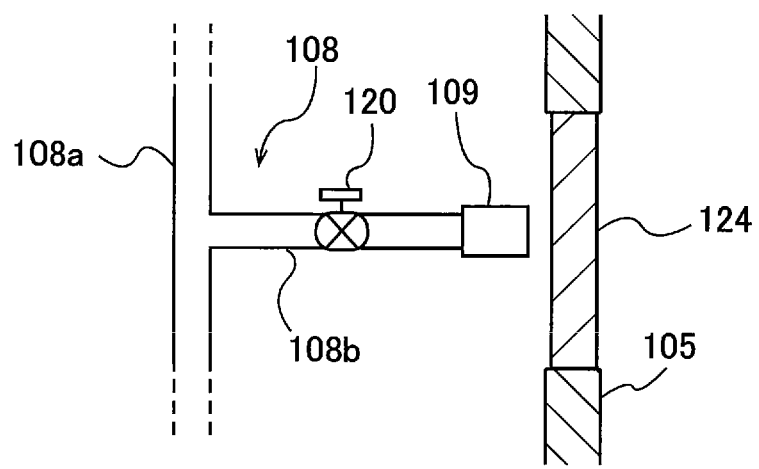
FIG. 11A is a schematic view showing an enlarged branch pipe of the water supply system shown in FIG. 10.
Figure 11B:
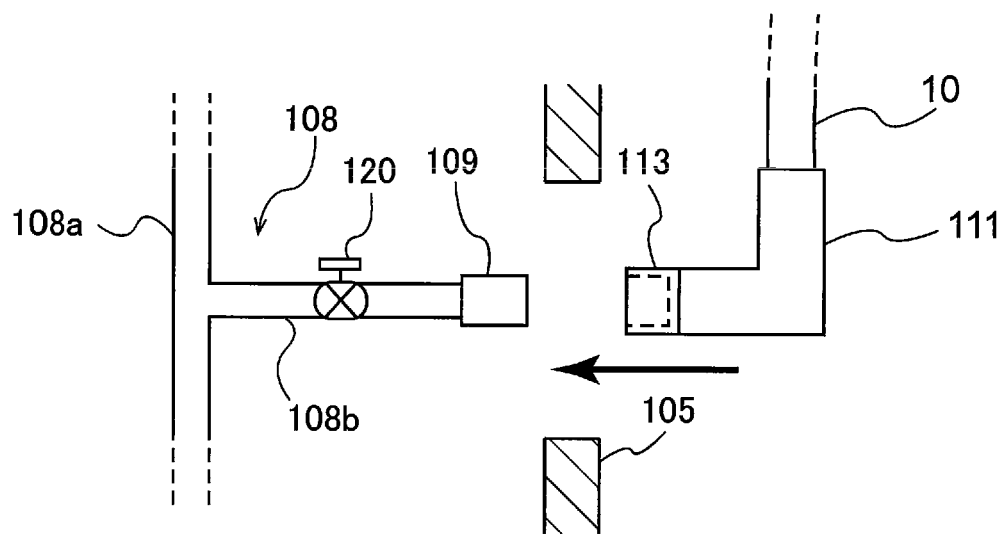
FIG. 11B is a schematic view showing a preparatory stage of coupling an attachment member of the fire hose to the branch pipe of the water supply system shown in FIG. 10.
Figure 11C:
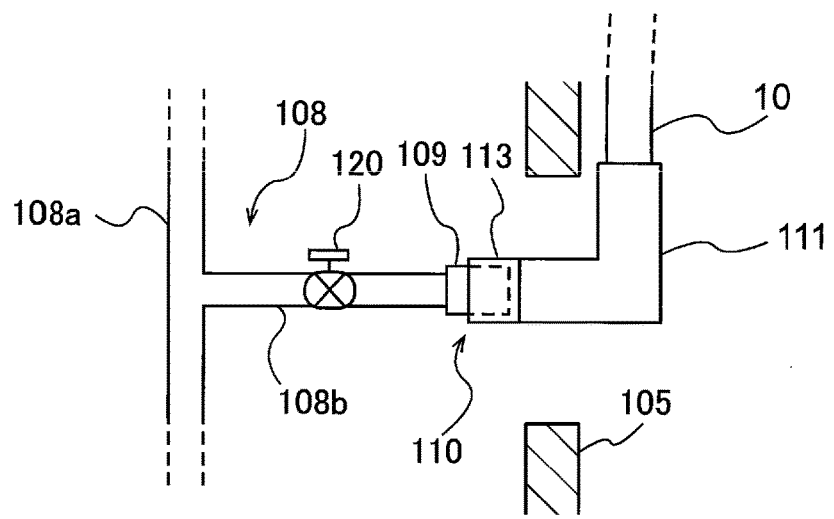
FIG. 11C is a schematic view showing a state in which the fire hose is coupled to the branch pipe of the water supply system shown in FIG. 10.

FIGS. 11A through 11C are schematic views to illustrate the process of coupling the attachment member 111 shown in FIG. 10 to the water supply system 102. More specifically, FIG. 11A is a schematic view showing an enlarged branch pipe 108b of the water supply system 102 before coupling of the attachment member 111, FIG. 11B is a schematic view showing a preparatory stage of coupling the attachment member 111 of the fire hose 10 to the branch pipe 108b of the water supply system 102, and FIG. 11C is a schematic view showing a state in which the fire hose 10 is coupled to the branch pipe 108b of the water supply system 102.

As shown in FIG. 11A, the branch pipe 108b is provided with an on-off valve 120. The on-off valve 120 is usually closed. When the on-off valve 120 is opened, water in the main pipe 108a of the water supply pipe 108 flows through the branch pipe 108b. Further, the water-supply-side connector 109 provided at the tip of the branch pipe 108b is adjacent to an emergency window 124 provided on a wall of the high-rise building 105. The emergency window 124 is usually closed. In one embodiment, the water-supply-side connector 109 may be adjacent to an emergency door (not shown) provided in the wall of the high-rise building 105. Alternatively, the water-supply-side connector 109 may protrude externally from the wall surface of the high-rise building 105.

When a fire occurs in the high-rise building 105, the emergency window 124 is opened (or removed), as shown in FIG. 11B. The controller 8 controls the operations of the plurality of drones 1, 6 so as to face the hose-side connector 113 of the attachment member 111 coupled to the terminal end of the fire hose 10, to the water-supply-side connector 109 provided at the tip of the branch pipe 108b. Next, as shown in FIG. 11C, a worker (e.g., a firefighter) performing firefighting activities in the high-rise building 105 couples the hose-side connector 113 to the water-supply-side connector 109. Further, the worker opens the on-off valve 120 provided on the branch pipe 108b to thereby supply water (fire extinguishing liquid) from the water supply system 102 to the fire hose 10.

Figure 12:
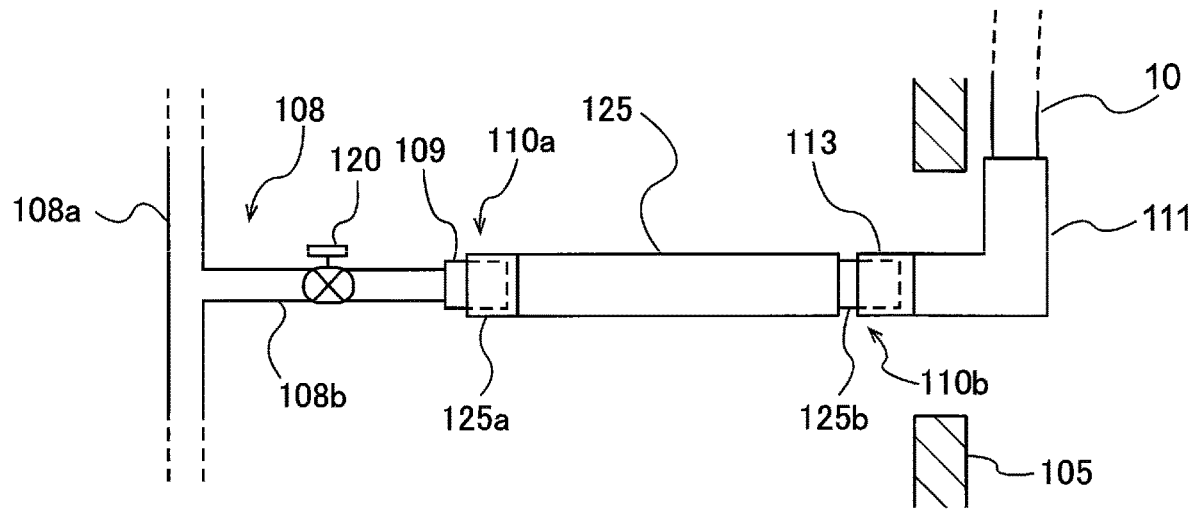
FIG. 12 is a schematic view showing a state in which the fire hose is coupled to the branch pipe of the water supply system through the connecting pipe.

FIG. 12 is a schematic view showing a state in which the fire hose 10 is coupled to the branch pipe 108b of the water supply system 102 through the connecting pipe 125. As shown in FIG. 12, the fire hose 10 may be coupled to the branch pipe 108b through the connecting pipe 125.

A first connecting-pipe connector 125a is provided at one end of the connecting pipe 125, which is configured to be detachable from a water-supply-side connector 109 provided at the tip of the branch pipe 108b of the water supply system 102. The water-supply-side connector 109 of the branch pipe 108b and the first connecting-pipe connector 125a of the connecting pipe 125 serve as a joint 110a that couples the connecting pipe 125 to the branch pipe 108b. Examples of the joint 110a include a screw-in joint and a one-touch joint.

A second connecting-pipe connector 125b is provided at the other end of the connecting pipe 125, which is configured to be detachable from the hose-side connector 113 of the attachment member 111. The hose-side connector 113 of the attachment member 111 and the second connecting-pipe connector 125b of the connecting pipe 125 serve as a joint 110b that couples the connecting pipe 125 to the attachment member 111. Examples of the joint 110a include a screw-in joint and a one-touch joint.

The first connecting-pipe connector 125a of the connecting pipe tube 125 is coupled to the water-supply-side connector 109 of the branch pipe 108b, and the second connecting-pipe connector 125b of the connecting pipe 125 is coupled to the hose-side connector 113 of the attachment member 111, so that the fire hose 10 is coupled to the water supply system 102 through the connecting pipe 125. In one embodiment, instead of the connecting pipe 125, a flexible connecting-hose with the first connecting-pipe connector 125a and the second connecting-pipe connector 125b may be used. These configurations allow the fire hose 10 to be coupled to the water supply system 102, even if the branch pipe 108b is away from the wall of the high-rise building 105.

Figure 13:
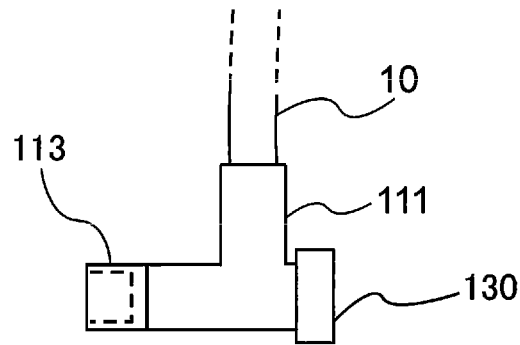
FIG. 13 is a schematic view showing a modification of the attachment member.

FIG. 13 is a schematic view showing a modification of the attachment member 111. As shown in FIG. 13, a counterweight 130 may be attached to the bent portion of the attachment member 111 having the L-shape. The counterweight 130 is a weight attached to the attachment member 111 in order to maintain a horizontal attitude of the hose-side connector 113. The counterweight 130 allows the hose-side connector 113 to maintain the horizontal attitude, so that a workability of coupling the hose-side connector 113 to the water-supply-side connector 109 of the branch pipe 108b (or the second connecting-pipe connector 125b of the connecting pipe 125) is increased.

Figure 14:
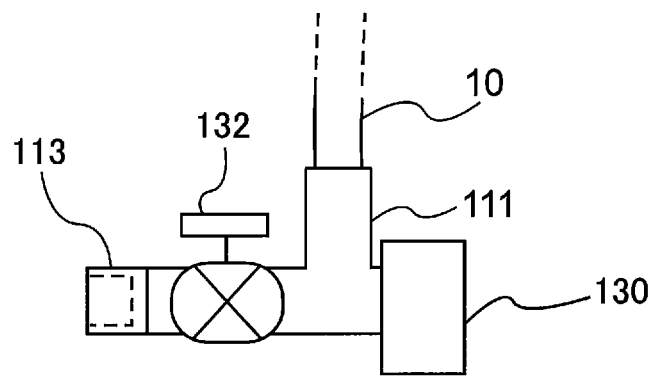
FIG. 14 is a schematic view showing another modification of the attachment member.

FIG. 14 is a schematic view showing another modification of the attachment member 111. The attachment member 111 shown in FIG. 14 has the above-described counterweight 130 as well as an on-off valve 132 capable of opening and closing the flow path formed in the attachment member 111. After coupling the fire hose 10 to the water supply system 102 through the attachment member 111, the on-off valve 132 is opened, thereby starting a supply of water into the fire hose 10. After the fire fighting activities are completed, the on-off valve 132 is closed, thereby preventing the water remaining in the fire hose 10 from flowing back into the water supply system 102. Thus, closing of the on-off valve 132 before the attachment member 111 is removed from the branch pipe 108b of the water supply system 102 prevents the water remaining in the fire hose 10 from splashing into the high-rise building 105. In one embodiment, the counterweight 130 may be omitted.

Figure 15:
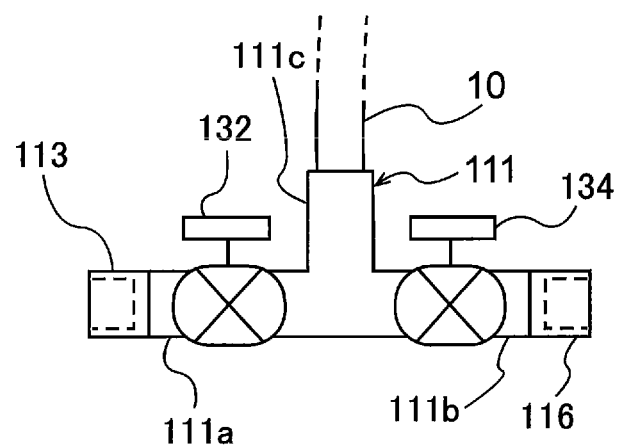
FIG. 15 is a schematic view showing still another modification of the attachment member.

FIG. 15 is a schematic view showing still another modification of the attachment member 111. The attachment member 111 shown in FIG. 15 has a T-shape with a first branch section 111a, a second branch section 111b, and a third branch section 111c. The first branch section 111a and the second branch section 111b branch from the third branch 111c, and extend in opposite directions to each other. The terminal end of the fire hose 10 is coupled to the third branch section 111c, and the hose-side connector 113 described above is arranged at a tip of the first branch section 111a. The on-off valve 132 described above is disposed between a connection of the first branch section 111a and the third branch section 111c, and the hose-side connector 113. At a tip of the second branch section 111b, a hose-side connector 116 having the same structure as the hose-side connector 113 is disposed. An on-off valve 134 having the same structure as the above-described on-off valve 132 is disposed between the connection of the second branch section 111b and the third branch section 111c, and the hose-side connector 116.

According to the attachment member 111 of this embodiment, either the hose-side connector 113 or the hose-side connector 116 can be coupled to the water-supply-side connector 109 of the branch pipe 108b. Therefore, the worker performing fire fighting activities can couple the fire hose 10 to the water supply system 102 by catching either the hose-side connector 113 or the hose-side connector 116, thus increasing a workability of the fire fighting activities. When the hose-side connector 113 (or the hose-side connector 116) is coupled to the water-supply-side connector 109 of the branch pipe 108b, the on-off valve 132 (or the on-off valve 134) is opened and the on-off valve 134 (or the o-off valve 132) is closed. Performing these operations prevents water supplied from the water supply system 102 from being discharged from the hose-side connector 116 (or the hose-side connector 113).

The first branch section 111a and the second branch section 111b are preferably arranged mirror-symmetrically with respect to the third branch section 111c. Furthermore, the on-off valve 132 and the on-off valve 134 are also preferably arranged mirror-symmetrically with respect to the third branch section 111c. With such structure, horizontal attitudes of the hose-side connector 116 and the hose-side connector 113 can be maintained without providing a counterweight.

Figure 16:
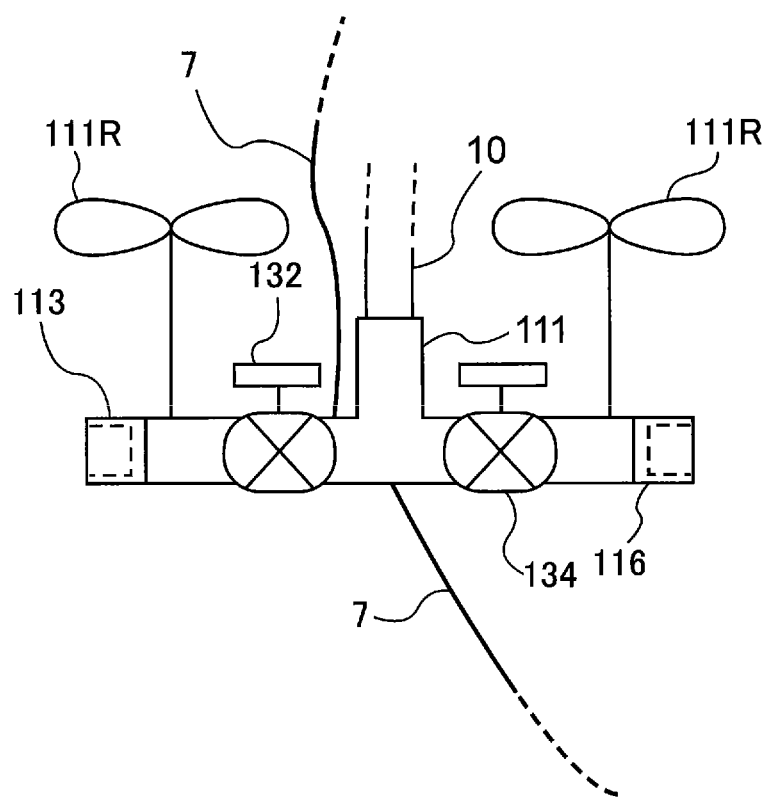
FIG. 16 is a schematic view showing still another modification of the attachment member.

FIG. 16 is a schematic view showing still another modification of the attachment member 111. The attachment member 111 shown in FIG. 16 is configured as a drone having rotary blades 111R that serve as the thrust generation mechanism. The relay cable 7 extending from the power supply unit 3 (see FIG. 10) is coupled to the attachment member 111, and power to rotate the rotor blades 111R is supplied from the power supply unit 3 to the attachment member 111 through the relay cable 7. The relay drone 6, which is located above the attachment member 111, is powered by the relay cable 7 extending from the attachment member 111.

Operations of the attachment member 111 shown in FIG. 16 are controlled by the controller 8. Therefore, the attachment member 111 can be easily approached to the water-supply-side connector 113 of the branch pipe 108b. When the joint 110 constructed of the water-supply-side connector 109 of the branch pipe 108b and the hose-side connector 113 of the attachment member 111 is the one-touch joint, the controller 8 can control the operations of the attachment member 111 to automatically couple the hose-side connector 113 of the attachment member 111 to the water-supply-side connector 109 of the branch pipe 108b. According to this attachment member 111, the fire hose 10 can be easily and automatically coupled to the water supply system 102, so that the workability of the fire fighting activities is increased.

Although not shown, the attachment member 111 configured as a drone may have an internal-combustion engine for rotating the rotary blades 111R. Further, instead of the rotor blades 111R, the attachment member 111 may have the rotors that is rotated by electric power or an internal-combustion engine, may have the engine 35 described with reference to FIG. 6, or may have the injection nozzles 37 described with reference to FIG. 7.

Figure 17:
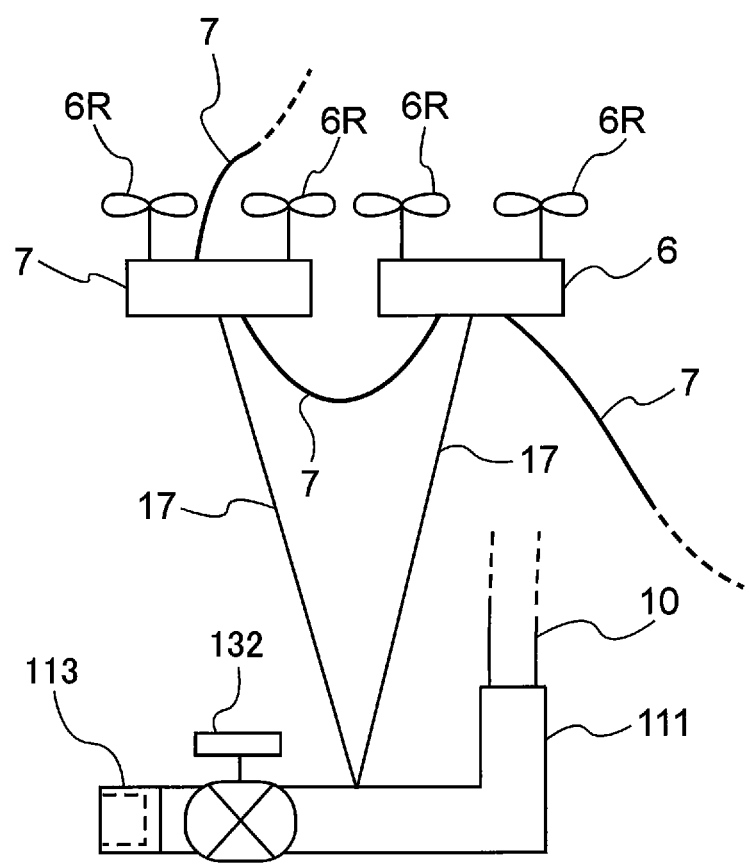
FIG. 17 is a schematic view showing still another modification of the attachment member.

FIG. 17 is a schematic view showing still another modification of the attachment member 111. The attachment member 111 shown in FIG. 17 is coupled to the plurality (two in this embodiment) of relay drones 6 through the coupling tools 17, such as the wire. In one embodiment, the attachment member 111 may be coupled to only one relay drone 6. The controller 8 can control the operations of the relay drones 6 coupled to the attachment member 111 to approach or couple the hose-side connector 113 of the attachment member 111 to the water-supply-side connector 109 of the branch pipe 108b. Further, the controller 8 can control the operations of the relay drones 6 coupled to the attachment member 111 to maintain the horizontal attitude of the hose-side connector 116. Therefore, according to the attachment member 111 of this embodiment, the fire hose 10 can be easily coupled to the water supply system 102, so that the workability of the fire fighting activities is increased.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a fire fighting system for transporting a nozzle of a fire hose coupled to a drone.

REFERENCE SIGNS LIST 1 top drone
2 fire-extinguishing-liquid supply source
3 power supply unit
4 wired cable
6 relay drone
7 relay cable
8 controller
10 fire hose
11 nozzle
12 power source
13 internal-combustion engine
15 pump
17 coupling tool (wire)
18 solar cell panel
19 compressor
21 hanging tool (wire)
24 ejection mechanism
25 anchor
26 engagement hook
28 claw
29 rod-shaped member 30 auxiliary drone
31 auxiliary wired cable
32 coupling tool (wire)
35 engine
37 injection nozzle
40 booster pump (relay pump)
100 fire fighting system
102 water supply system
105 high-rise building
106 water supply unit
108 water supply pipe
109 water-supply-side connector
110,110a,110b joint
111 attachment member
113,116 hose-side connector
125 connecting pipe
125a,125b connecting-pipe connector
130 counterweight
132,134 on-off valve

The invention claimed is:

1. A fire fighting system, comprising:
 a fire hose having a nozzle for injecting a fire extinguishing liquid;
 a fire-extinguishing-liquid supply source which is coupled to the fire hose, and supplies the fire extinguishing liquid to the fire hose;
 a top aircraft-drone coupled to the nozzle;
 a wired cable coupled to the top aircraft-drone; and
 a power supply unit which supplies power for flying the top aircraft-drone through the wired cable,
 wherein the top aircraft-drone has an ejection unit for ejecting an anchor.

2. The fire fighting system according to claim 1, wherein the top aircraft-drone has a solar cell panel disposed therein, and
 the solar cell panel supplies power for actuating the ejection unit, to the ejection unit.

* * * * *